United States Patent [19]
Fendt et al.

[11] Patent Number: 5,608,269
[45] Date of Patent: Mar. 4, 1997

[54] METHOD FOR ACTIVATING AN OUTPUT STAGE FOR SAFETY SYSTEMS IN A MOTOR VEHICLE

[75] Inventors: Günter Fendt; Peter Hora, both of Schrobenhausen; Hans Spies, Pfaffnehofen, all of Germany

[73] Assignee: Temic Telefunken microelectronic GmbH, Heilbronn, Germany

[21] Appl. No.: 424,616

[22] Filed: Apr. 19, 1995

[30] Foreign Application Priority Data

May 26, 1994 [DE] Germany ............... 44 18 293.7

[51] Int. Cl.⁶ .......................................... B60R 21/32
[52] U.S. Cl. ............... 307/9.1; 307/10.1; 280/735; 180/282; 340/436
[58] Field of Search ................... 307/9.1, 10.1; 180/268, 271, 282, 274; 280/728.1, 728.2, 729, 734, 735; 340/438, 449, 436, 440, 441, 467

[56] References Cited

U.S. PATENT DOCUMENTS

| | | | |
|---|---|---|---|
| 4,305,106 | 12/1981 | Bergman | 361/1 |
| 4,958,851 | 9/1990 | Behr et al. | 280/735 |
| 5,155,376 | 10/1992 | Ohano | 307/10.1 |
| 5,181,011 | 1/1993 | Ohano | 340/438 |
| 5,283,472 | 2/1994 | Takeuchi et al. | 307/10.1 |
| 5,309,030 | 5/1994 | Shultz | 307/10.1 |
| 5,475,269 | 12/1995 | Takeuchi | 307/10.1 |

FOREIGN PATENT DOCUMENTS

| | | |
|---|---|---|
| 3816590 | 11/1989 | Germany . |
| 3917806 | 12/1990 | Germany . |
| 4112579 | 10/1991 | Germany . |
| 4210861 | 10/1992 | Germany . |
| 4224477 | 2/1993 | Germany . |
| 4237404 | 5/1994 | Germany . |

*Primary Examiner*—William M. Shoop, Jr.
*Assistant Examiner*—Peter Ganjoo
*Attorney, Agent, or Firm*—Spencer & Frank

[57] ABSTRACT

Increasingly, motor vehicles are being equipped with safety systems for vehicle occupants and where these safety systems are controlled by electrically actuated triggering means such as ignition pills for airbags that in turn are controlled from an output stage. The invention demonstrates a method that ensures safe and uninterrupted operation of these triggering means and which protects the output stage from being destroyed should a fault occur as a result of, for example, an ignition pill by-pass.

5 Claims, 1 Drawing Sheet

METHOD FOR ACTIVATING AN OUTPUT STAGE FOR SAFETY SYSTEMS IN A MOTOR VEHICLE

BACKGROUND OF THE INVENTION

The invention relates to a method for activating an output stage, with a first and a second circuit-breaker, of a safety system for vehicle occupants having at least one electrically operated triggering means, wherein the first circuit-breaker connects the triggering means with an operating potential and the second circuit-breaker with a reference potential (ground) and a current detector is assigned to each circuit-breaker.

Furthermore, the invention also relates to a device for performing the method.

Increasingly, motor vehicles incorporate safety systems such as airbags, belt tighteners or roll sensors serving as a protection for vehicle occupants. These are safety-critical systems on which exacting demands are placed with respect to functional reliability. Examples of triggering means for these safety systems are ignition pills for belt tightener and airbag systems as well as relays for switching other safety systems. Such triggering means are usually arranged in a load circuit, containing in addition high and low switches and possibly mechanical switches, controlled by an output stage.

If the conditions for triggering a safety system are provided, it is important that the triggering means, such as ignition pills of airbag gas generators, be activated for a sufficient period of time with an appropriate safety factor. The activation of an output stage generates a flow of current in the load circuit so that ignition pills are heated up by the flow of current and thus start a pyrotechnic reaction. The ignition pills tend, however, to form parallel connections during or after ignition and the safety time factor provided for reliable activation of the ignition pills represents a danger for the output stage in the event of a parallel connection with rising current because if a fault occurs the output stage operates on a short circuit and is thus heavily loaded. In normal operation, the flow of current through the load circuit is interrupted by activation of the ignition pill and thus limited to the response time of the ignition pill.

SUMMARY OF THE INVENTION

The object of the invention is to provide a method of the kind mentioned at the outset that ensures a safe and no-fault output stage activation and protects the output stage against damage in the event of a fault, especially in the case of a parallel connection on a safety-relevant triggering means.

According to the invention, there is a control circuit which generates simultaneously a first and a second control signal each having a defined time length and such that the time length of the second control signal is shorter than that of the first control signal. During the overlapping time period of these two signals, the two circuit-breakers close in the event of a crash, when as a general rule a mechanical safety switch is also closed, so that a current now flows in the load circuit. As soon as the current starts to flow through the two switches, the two current detectors each generate a current signal indicating that current is flowing. This current signal which, through a switch, indicates the flow of current, ensures that the flow of current is maintained through the other switch during the non-overlapping period of the first and second control signals, respectively.

With this method according to the invention, on the one hand a very reliable triggering behavior of the triggering means, such as an ignition pill, is obtained because the difference in time periods of the two control signals represents a time safety factor; and on the other hand, in the event of a fault, the output stage activation is interrupted during the ignition process so that the output stage, and in particular the circuit-breakers, are protected against damage due to overloading. Finally, in the event of a fault, the method according to the invention prevents too much energy being taken from the storage capacitor that supplies the ignition energy by forcing the two circuit-breakers to open; this is of particular importance in such cases where only one common capacitor is available for igniting several triggering means.

In an advantageous embodiment of the method according to the invention, closing of the first circuit-breaker is effected by means of a first logic AND operation performed on the first and second control signal and also by closing the second switch through a second logic AND operation performed on the two control signals.

After cancelling the second control signal, the flow of current through the two circuit-breakers is forcibly maintained by gating the current signal that indicates the flow of current through the first circuit-breaker with the first control signal by means of the second logic AND operation and by gating the current signal that indicates the flow of current through the second circuit-breaker also with the first control signal by means of the first logic AND operation.

Finally, a system is proposed that allows the method according to the invention to be applied. This system includes a control unit, such as a microprocessor for instance, that generates the first and the second control signal, Furthermore, a logic circuit containing an AND gate and an OR gate is provided for each of these and each is assigned to a circuit-breaker. The control signals are supplied to these logic circuits and cause the circuit-breakers to be activated during the period of control signal overlap. The current signals of the current detector assigned to one of the circuit-breakers are supplied to the logic circuit assigned to the other circuit-breaker, and vice versa for the other current detector. Consequently, forcible activation of the circuit-breakers by the respective current signal is effected as long as a flow of current is detected through the two circuit-breakers, even though activation of the circuit-breakers has been cancelled by the second control signal.

BRIEF DESCRIPTION OF THE DRAWING

The invention will now be described and explained on the basis of an embodiment example in conjunction with the drawing which is a schematic circuit diagram of a preferred embodiment of the invention.

DESCRIPTION OF THE PREFERRED EMBODIMENTS

Figure 1:
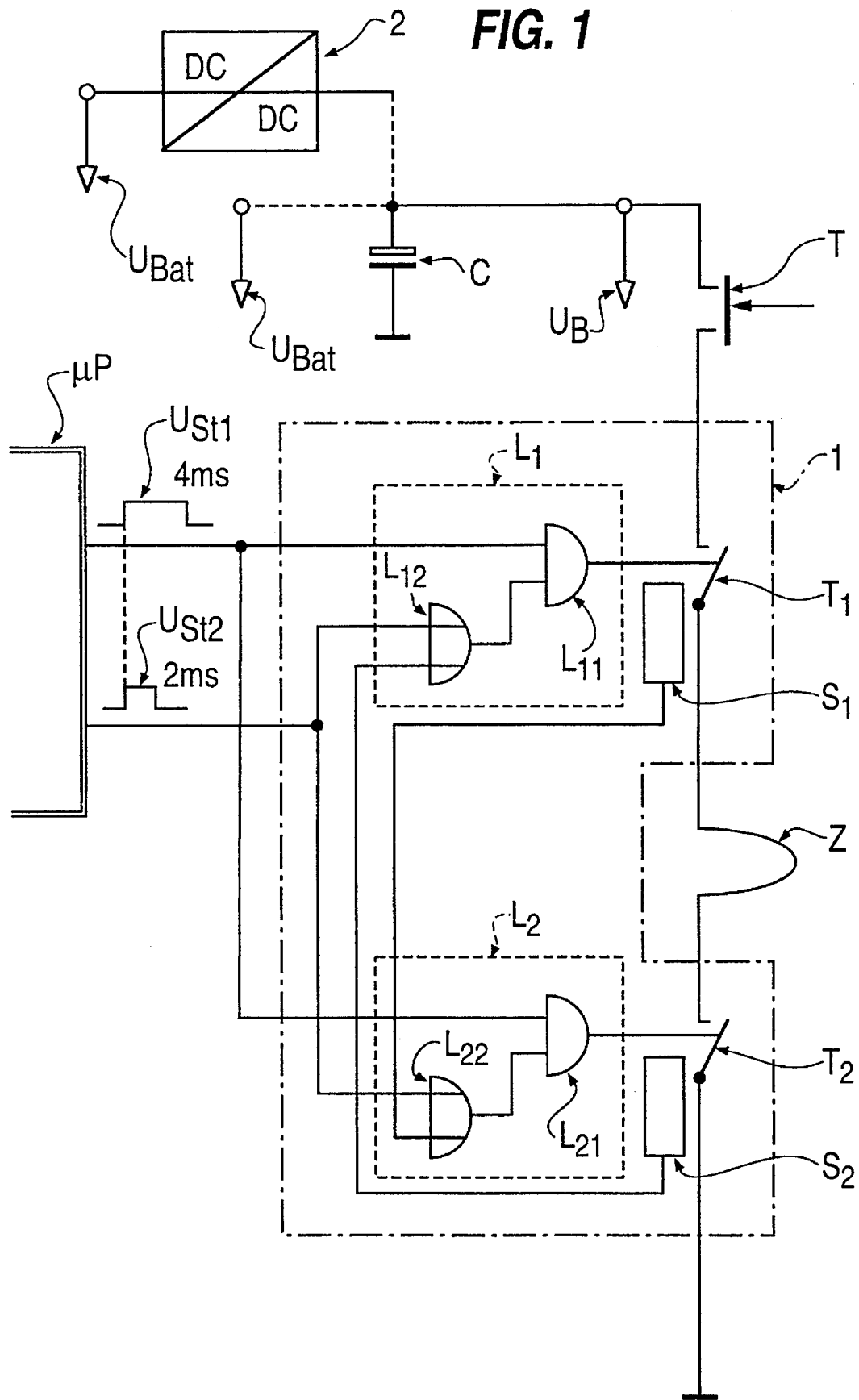

The FIG. shows an output stage 1 in accordance with the invention with a first circuit-breaker T1 and a second circuit-breaker T2 connected in a load circuit. This load circuit consists of a series circuit with a storage capacitor C that creates the operating potential $U_B$ for the load circuit, a mechanical safety switch T, the circuit-breakers T1 and T2 mentioned above, and a triggering means Z, representing an ignition pill for instance that is heated electrically when current flows through the load circuit, thereby initiating a pyrotechnic reaction.

The first circuit-breaker T1 connects the triggering means Z with the storage capacitor C via the mechanical safety switch T, while the second circuit-breaker T2 connects the triggering means Z with the operating potential, i.e., with ground.

A current detector S1 is assigned to circuit-breaker T1 and another current detector S2 is assigned to circuit-breaker T2. In their simplest form, these current detectors can be made in the form of a current shunt.

The circuit-breakers T1 and T2 are each driven by a logic circuit L1 and L2, respectively. In principle, these two logic circuits L1 and L2 are of identical design, each containing an AND gate $L_{11}$ and $L_{21}$ respectively, and an OR gate $L_{12}$ and $L_{22}$, respectively, where each of these gates has two inputs. The output of each AND gate $L_{11}$ and $L_{21}$, respectively is taken to the control electrode of the first switch T1 and of the second switch $T_2$, respectively. A first control signal $U_{st1}$, generated by a control unit, such as a microprocessor μP, is applied to one of the two inputs of both AND gates $L_{11}$ and $L_{21}$. The second input of each AND gate $L_{11}$ and $L_{21}$ respectively is connected to the output of the OR gate $L_{12}$ or $L_{22}$, respectively. A second control signal $U_{st2}$, also generated by the microprocessor μP, is applied to one input of both OR gates $L_{12}$ and $L_{22}$. Finally, the current signal generated by the current detector S1, that indicates the flow of current through the first circuit-breaker T1, is supplied to the as yet still free second input of the OR gate $L_{22}$ of the second logic circuit L2 and, similarly, the current signal of the second current detector S2 is sent to the second input of the OR gate $L_{12}$ of the first logic circuit L1.

If the criteria required for triggering the safety system through the triggering means Z exist, the microprocessor μP generates the first and the second control signals $U_{st1}$ and $U_{st2}$ simultaneously, which in accordance with the FIG., for example, are generated with a pulse length of 4 ms and 2 ms respectively and which, as a logic signal, represent an H (high) level with a length of 4 ms and 2 ms respectively. The operating time for the two circuit-breakers T1 and T2 is thus 4 ms as determined by the microprocessor μP. A time of less than 4 ms is generally sufficient for activating the triggering means Z. In the present instance of an ignition pill, the time is 2 ms. Thus, a safety time factor 2 is provided in the operating time in order to ensure triggering of the triggering means Z in all events. If triggering means with other triggering times are employed, correspondingly different pulse lengths must be selected for the control signals $U_{st1}$ and $U_{st2}$. If the vehicle collides with an obstacle, the mechanical safety switch T is closed by the physical acceleration so that it is now possible for an ignition current supplied from the storage capacitor C to flow through the two circuit-breakers T1 and T2 and the ignition pill Z. The storage capacitor C is supplied from the battery voltage $U_{Bat}$ of an on-board battery or from a higher voltage provided by a DC/DC converter (up-converter) 2.

When current flows through the two circuit-breakers T1 and T2, a flow of current is detected by the respective current detectors S1 and S2 and this is supplied as a current signal in the form of a logical H level to the logic circuit that operates the other circuit-breaker respectively. Consequently, if triggering occurs after 2 ms, operation of the two circuit-breakers T1 and T2 is cancelled through the two OR gates $L_{12}$ and $L_{22}$ because the second control signal $U_{st2}$ now changes to an L (low) level. Nonetheless, the two circuit-breakers T1 and T2 remain closed until one of the two current detectors S1 or S2 detects no further flow of current because an L level is then generated by a current detector that is supplied to the second input of the corresponding AND gate $L_{11}$ or $L_{21}$, respectively, and so causes the corresponding circuit-breaker to open. In this way, the two circuit-breakers T1 and T2 are forcibly held closed during the 4 ms period defined by the first control signal $U_{st1}$ until the ignition current is interrupted by the activated ignition pill Z.

Now, ignition pills of this kind tend to create by-pass circuits after or during ignition, leading to a rise in the flow of current through one of the two circuit-breakers, thereby representing a hazard for the output stage because if such a fault occurs the output stage is working on a short circuit and is therefore subjected to heavy loading that might even cause it to be destroyed.

If such a by-pass circuit is created after activation of the ignition pill Z, one of the two current detectors S1 or S2 can no longer detect any current and consequently operation of the current-carrying circuit-breaker is interrupted. Consequently, if a fault occurs during the ignition process, the output stage activation is interrupted and the output stage and its bond wires are reliably protected against destruction.

At the same time, it is prevented that too much energy is taken from the storage capacitor C should such a fault occur. This is of particular importance, or indeed essential, if only one common capacitor is available for igniting several output stages. When the circuit according to the invention is applied, it is therefore possible to make use of just a single capacitor to provide ignition energy and autarky energy.

The application of the invention is not just limited to the activation of an ignition pill as triggering means, as shown in the FIG., but it is also suitable for the use of other safety systems. For example, a relay or even a magnetic coil for injection valves can represent the triggering means.

What is claimed is:

1. Method for activating an output stage, with a first and second circuit-breaker, of a safety system for vehicle occupants having at least one electrically operated triggering means, where the first circuit-breaker connects the triggering means with an operating potential and the second circuit-breaker with a reference potential (ground) and a current detector is assigned to each circuit-breaker, comprising:

a) simultaneously generating a first and a second control signal each with a specific time length, where the second control signal is of shorter duration than the first control signal;

b) in response to the first and the second control signals, causing the first and second circuit-breakers to close during the overlapping period of these control signals;

c) as soon as current starts to flow through the first and the second circuit-breakers, generating, via the two current detectors, respective current signals indicating the respective flow of current; and d) using the current signal indicating the flow of current through a circuit-breaker to cause the flow of current to be maintained through the other circuit-breaker in each case during the period when the first and the second control signals do not overlap.

2. Method in accordance with claim 1, wherein the first and the second control signals cause the first circuit-breaker to be closed via a first logical AND circuit and the second circuit-breaker via a second logical AND circuit.

3. Method in accordance with claim 2, wherein the current signal indicating the flow of current through the first circuit-breaker and the first control signal through the second logical AND gate cause the flow of current through the second circuit-breaker to be maintained, and the current signal indicating the flow of current through the second circuit-breaker and the first control signal through the first logical AND gate cause the flow of current through the first circuit-breaker to be maintained.

4. An output stage of a safety system for vehicle occupants comprising:

at least one electrically operated triggering means;

a first circuit-breaker connecting the trigger means with an operating potential;

a second circuit-breaker connecting the triggering means with a reference potential;

a respective current detector for each said circuit-breaker;

a control unit for simultaneously generating a first and a second control signal each with a specific time length and with the second control signal being of a shorter duration than the first control signal;

a first and a second logic circuit for activating the first and the second circuit-breakers, respectively;

said first and said second logic circuit each have an AND gate and an OR gate, each of which has a first and a second input and an output;

the outputs of the two AND gates represent, in each case, the output of the first and of the second logic circuit, respectively;

means supplying the first control signal to the first inputs of the two AND gates;

means supplying the second control signal to the first inputs of the two OR gates;

means connecting the outputs of the two OR gates to the second input of the respective AND gates of the associated logic circuit;

means supplying the output signal from the current detector for the first circuit-breaker to the second input of the OR gate of the second logic circuit; and means supplying the output signal from the current detector for the second circuit-breaker to the second input of the OR gate of the first logic circuit.

5. An output stage in accordance with claim 4, wherein a storage capacitor is provided to generate the operating potential.

* * * * *